United States Patent [19]

Takahashi et al.

[11] Patent Number: 4,661,697

[45] Date of Patent: Apr. 28, 1987

[54] OPTICALLY REFLECTING CODE PLATE

[75] Inventors: Yoshihiro Takahashi; Hiraku Abe, both of Furukawa; Kourou Hayasaka, Tokyo, all of Japan

[73] Assignee: Alps Electric Co., Ltd., Japan

[21] Appl. No.: 723,049

[22] Filed: Apr. 15, 1985

[30] Foreign Application Priority Data

Apr. 13, 1984 [JP] Japan ................................ 59-73069

[51] Int. Cl.$^4$ ............................................. G01D 5/34
[52] U.S. Cl. ........................ 250/231 SE; 250/237 G; 235/488
[58] Field of Search ...................... 235/454, 487, 488; 250/231 SE, 237 G, 566; 340/347 P; 356/395; 400/144.3, 145.1

[56] References Cited

U.S. PATENT DOCUMENTS

| | | | |
|---|---|---|---|
| 4,074,798 | 2/1978 | Berger | 400/144.3 |
| 4,141,780 | 2/1979 | Kleinknecht et al. | 356/138 X |
| 4,230,939 | 10/1980 | de Bont et al. | 235/488 |
| 4,286,871 | 9/1981 | Erickson | 250/237 G |

FOREIGN PATENT DOCUMENTS 58-18369 8/1984 Japan .

*Primary Examiner*—Eugene R. LaRoche
*Assistant Examiner*—Steven J. Mottola
*Attorney, Agent, or Firm*—Guy W. Shoup

[57] ABSTRACT

Herein disclosed is an optically reflecting code plate having a number of reflective and unreflective portions formed alternately on the surface of its substrate. This substrate is made of aluminum of high purity, for example, and has its surface anodized with a colorless, transparent and porous aluminum oxide film. At predetermined positions of the oxide film, which are to be formed with the aforementioned unreflective portions, moreover, metal such as nickel, tin, copper, iron, cobalt, silver, manganese or selenium is deposited by electrodeposition in the bottoms of the pores of the oxide film thereby to form a metal-deposited layer. Moreover, the vicinities of the openings of the aforementioned pores are impregnated with a dye such as a black metallized complex salt dye or a Nigrosine dye to form a dye-impregnated layer. The aforementioned metal-deposited layer and the dye-impregnated layer are overlaid the later over the former thereby to form the unreflective portions. The remaining portion shaving neither the metal-deposited layer nor the dye-impregnated layer so that it is exposed directly to the outside is left as the reflective portions.

3 Claims, 5 Drawing Figures

OPTICALLY REFLECTING CODE PLATE

BACKGROUND OF THE INVENTION

1. Field of the Invention

The present invention relates to an optically reflecting code plate to be used with a rotary encoder of optical type, for example, and to a pattern layout of the code plate.

2. Description of the Prior Art

The rotary encoder of optical type is constructed of a code disc, which is formed alternately with a number of slit-shaped reflective and unreflective portions on the surface of a substrate in the circumferential direction, and a sensor head which is composed of an light emitting element and a light receiving element and which is arranged to face the surface of the code plate.

Before entering into detailed description of the present invention, cursory review will be made upon the background of the code disc of the present invention.

FIG. 1 is a side elevation showing a motor which is equipped with the rotary encoder, and FIG. 2 is a top plan view showing the code disc which is used in the rotary encoder.

On the drive shaft 2 of a motor 1, there is fixed a code disc 3 which is made rotatable together with the drive shaft 2. The code disc 3 is formed in the vicinity of its outer circumference, as shown in Fig. 2, with a number of slit-shaped white reflective portions 4 and black unreflective portions 5 which are arranged regularly and alternately in the circumferential direction. Reverting to FIG. 1, a sensor head 6 is arranged at a position to face the surface of the code disc 3 formed with those reflective and unreflective portions 4 and 5. That sensor head 6 is equipped with at least one light emitting element 7 such as an LED and a light receiving element 8 such as a photo transistor. The beam emitted from the light emitting element 7 is reflected by the reflective portions 4 so that the reflected beam is received by the light receiving element 8. If the beam irradiates the unreflective portions 5, on the contrary, it does not come into the the light receiving element 8. By counting the number of times of beam receptions of the light receiving element 8, therefore, it is possible to control the angle of rotation of the motor and to detect the r.p.m. of the same.

In order to enhance the detecting sensitivity of the rotary encoder thus constructed, the code disc 3 has to be formed with such a pattern as to reflect and absorb the beam highly efficiently and accurately. Especially, if the code disc 3 is reduced in diameter or if the slit widths are narrowed in accordance with the increase in the number of the reflective and unreflective portions 4 and 5, it becomes difficult to conduct the optical reflection and absorption highly efficiently and accurately.

SUMMARY OF THE INVENTION

It is, therefore, an object of the present invention to provide an optically reflecting code plate which can conduct the optical reflection and absorption highly efficiently and accurately.

In order to achieve this object, according to the present invention, in an optically reflecting code plate having a number of reflective and unreflective portions formed alternately on the surface of its substrate, this substrate is made of aluminum of high purity, for example, and has its surface anodized with a colorless, transparent and porous aluminum oxide film. At predetermined positions of the oxide film, which are to be formed with the aforementioned unreflective portions, moreover, metal such as nickel, tin, copper, iron, cobalt, silver, manganese or selenium is deposited by electrodeposition in the bottoms of the pores of the oxide film thereby to form a metal-deposited layer. Moreover, the vicinities of the openings of the aforementioned pores are impregnated with a dye such as a black metallized complex salt dye or a Nigrosine dye to form a dye-impregnated layer. The aforementioned metal-deposited layer and the dye-impregnated layer are overlaid the later over the former thereby to form the unreflective portions. The remaining portion shaving neither the metal-deposited layer nor the dye-impregnated layer so that it is exposed directly to the outside is left as the reflective portions.

According to a major feature of the present invention, there is provided an optically reflecting code plate having a multiplicity of reflective portions and unreflective portions formed alternately on the surface thereof, comprising: a substrate made of aluminum; a colorless, transparent and porous aluminum oxide film formed on the surface of said substrate; a metal-deposited layer formed in a predetermined position on said aluminum oxide film and having metal deposited in the bottoms of the pores of said aluminum oxide film; and a dye-impregnated layer impregnated with a dye and overlaid near the openings of the pores of said aluminum oxide film for providing said unreflective portions while leaving those portions of said aluminum oxide film, which are exposed directly to the outside, as said reflective portions.

BRIEF DESCRIPTION OF THE DRAWINGS

Other objects, features and advantages of the present invention will become apparent from the following description taken in conjunction with one embodiment thereof with reference to the accompanying drawings, in which.

DESCRIPTION OF THE PREFERRED EMBODIMENT

The present invention will be described in the following in connection with the embodiment thereof with reference to the accompanying drawings.

Figure 5:
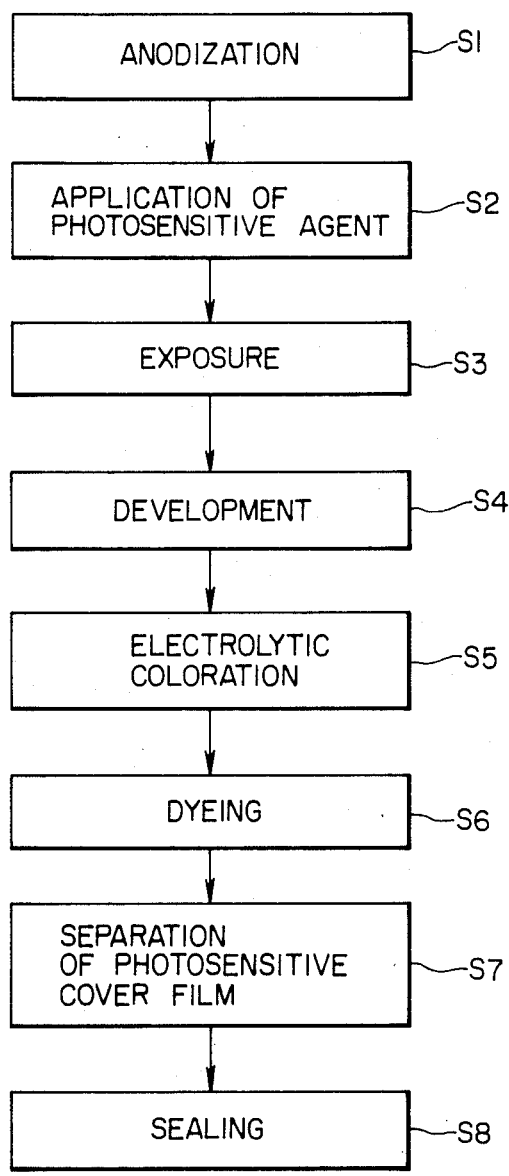
FIG. 5 is a flow chart showing the process for fabricating the code plate.

The substrate is made of a highly pure aluminum plate and is anodized at a step (which will be shortly referred to as "S") 1, as shown in FIG. 5. For this anodization, considerations are taken so that the aluminum surface having a gloss may not have its reflectivity lost and so that coloration into black by the metal may be effected sufficiently at a subsequent coloring treatment, and electrolysis is conducted by a DC current or a deformed AC current in an electrolytic bath containing sulfuric acid, phosphoric acid, sulfamic acid or caustic soda. Thus, the substrate 9 is formed on its surface uniformly with a colorless, transparent an porous aluminum oxide film (which will be shortly referred to as an "oxide film").

At a subsequent step S2, a printing photosensitive agent is applied so that an etching and another anodization may be required as little as possible for subsequent steps of electrolytic coloration and dying treatment, and a cover film of photosensitive agent having a uniform thickness is formed by a drying treatment.

Figure 1:
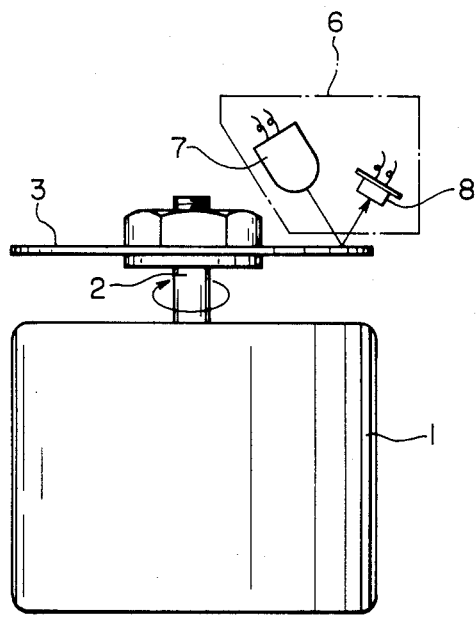
FIG. 1 is a side elevation showing the motor which is equipped with the rotary encoder.
Figure 2:
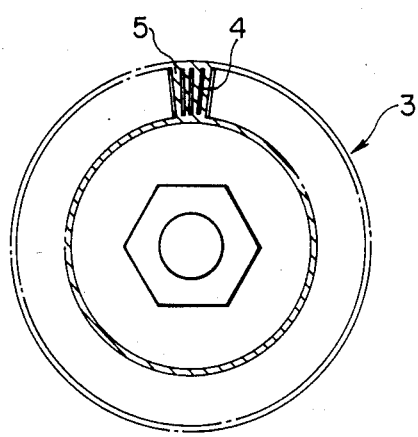
FIG. 2 is a top plan view showing the code disc which is used in the rotary encoder.
Figure 3:
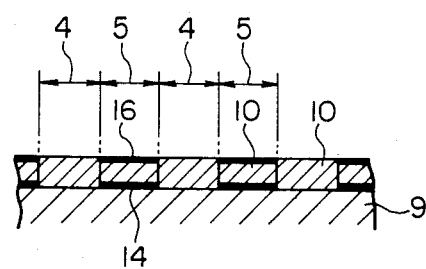
FIG. 3 is an enlarged sectional view showing a portion of a code plate according to the embodiment of the present invention.
Figure 4:
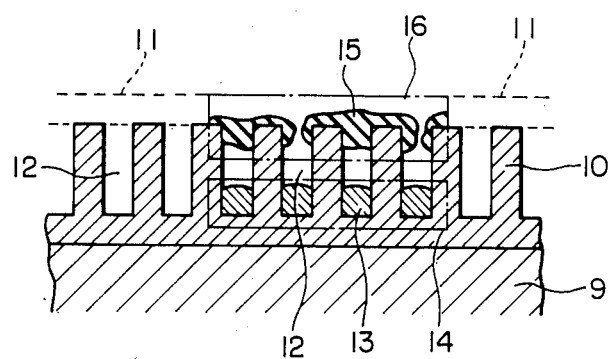
FIG. 4 is a schematic view showing the vicinity of the unreflective portion of the code plate.

Next, at steps S3 and S4, a mask having a code pattern is placed on the photosensitive agent cover film and is exposed and developed to remove the photosensitive agent cover film portion left exposed thereby to form a photosensitive cover film 11 (as shown in FIG. 4) having a fine pattern on the oxide film 10.

At a step S5, metal 13 is deposited by the electrolytic coloration in the bottoms of the pores 12 of the oxide film 10 at portions having none of the photosensitive cover film 11. The electrolytic bath used at this time contains one or two kinds of metal salts of nickel, tin, copper, iron, cobalt, silver, manganese or selenium, and the electrolysis is conducted by using carbon as opposed electrodes and by an AC sinsoidal current of 50 to 60 Hz. The metal 13 thus deposited in the bottoms of the pores 12 by that electrolysis is as if it were dispersed in a colloidal state, because it is dispersed in the pores 12 having a size of the order of several hundreds Å, so that it scatters the beam to look black. Thus, a metal-deposited layer 14 is formed.

After this, at a step S6, the surface of the substrate 9 is exposed to an ink or solution, which contains a dye such as a black metallized complex salt dye or Nigrosine dye absorptive of an infrared ray, so that the dye is adsorbed in the pores 12 at the portions where the photosensitive cover film 11 is not formed. This black dye 15 is caught mainly in the vicinities of the openings of the pores 12, as schematically shown in FIG. 4, to form a dye-impregnated layer 16.

At a step S7, the photosensitive cover film 11 formed on the oxide film 10 is separated by the use of a solution of calcium salt. At a step S8, the remaining structure is boiled with hot water to form an aluminum hydrate on the surface of the oxide film 10 thereby to seal up the pores 12.

Incidentally, a rinsing treatment and/or a drying treatment are conducted at each step, if necessary.

As has been described hereinbefore, the metal-deposited layer 14 and the dye-impregnated layer 16 are overlaid the latter over the former to form the unreflective portions 5 while leaving the reflective portions 4 at portions where the metal-deposited layer 14 and the dye-impregnated layer 16 are not formed.

According to the present invention having the construction thus far described, the reflective portions can reflect an incident beam highly efficiently thanks to the characteristics of aluminum. On the other hand, most of the beam illuminating the unreflective portions is absorbed by the dye-impregnated layer so that a small quantity of beam left unabsorbed is absorbed by the metal-deposited layer. Moreover, a beam reflected faintly, if any, can be triply absorbed, because it is absorbed again by the dye-impregnated layer, so that the optical absorptivity can be remarkably enhanced. As has been described hereinbefore, according to the present invention, it is possible to provide an optically reflecting code plate which can reflect and absorb a beam highly efficiently and accurately.

Moreover, the dye-impregnated layer is strong against wear, because it is formed substantially in the pores of the aluminum oxide film, and is excellent in resistances to heat and climate.

The process of fabricating the code plate thus far described in the foregoing embodiment can form the code pattern highly accurately because it resorts to the photographic printing method followed by no etching treatment.

The description of the foregoing embodiment has been made upon the case in which the present invention is applied to the rotary encoder. Despite of this fact, however, the present invention should not be limited thereto but can be applied to a fixed type encoder which extends straight, for example.

What is claimed is:

1. An optically reflecting code plate having a multiplicity of reflective portions and unreflective portions formed alternately on the surface thereof, comprising: a substrate made of aluminum; a colorless, transparent and porous aluminum oxide film formed on the surface of said substrate; a metal-deposited layer formed in a predetermined position on said aluminum oxide film and having metal deposited in the bottoms of the pores of said aluminum oxide film; and a dye-impregnated layer impregnated with a dye and overlaid near the openings of the pores of said aluminum oxide film for providing said unreflective portions while leaving those portions of said aluminum oxide film, which are exposed directly to the outside, as said reflective portions.

2. An optically reflecting code plate according to claim 1, wherein said metal is selected from the group consisting of nickel, tin, copper, iron, cobalt, silver, manganese and selenium.

3. An optically reflecting code plate according to claim 1, wherein said dye is selected from the group consisting of a black metallized complex salt dye and a Nigrosine dye.

* * * * *